C. J. HIXSON.
CLAMPING EAR FOR TROLLEY WIRES.
APPLICATION FILED AUG. 25, 1911.

1,047,523.

Patented Dec. 17, 1912.

Witnesses:
George H. Tilden
J. Ellis Ellen

Inventor:
Clinton J. Hixson,
by Albert G. Davis
His Attorney.

UNITED STATES PATENT OFFICE.

CLINTON J. HIXSON, OF SCHENECTADY, NEW YORK, ASSIGNOR TO GENERAL ELECTRIC COMPANY, A CORPORATION OF NEW YORK.

CLAMPING-EAR FOR TROLLEY-WIRES.

1,047,523.   Specification of Letters Patent.   Patented Dec. 17, 1912.

Application filed August 25, 1911. Serial No. 646,046.

*To all whom it may concern:*

Be it known that I, CLINTON J. HIXSON, a citizen of the United States, residing at Schenectady, county of Schenectady, State of New York, have invented certain new and useful Improvements in Clamping-Ears for Trolley-Wires, of which the following is a specification.

This invention relates to suspension of electric conductors, and more especially to mechanical clamping ears for trolley wires of electric railways.

The object of the invention is to provide a mechanical clamping ear which may be readily secured to a fixed suspension bolt, which when secured will be absolutely rigid, and which will occupy a minimum space between trolley wire and suspension bolt.

One form of my invention is shown in the accompanying drawing forming a part of this specification, in which—

Figure 1:
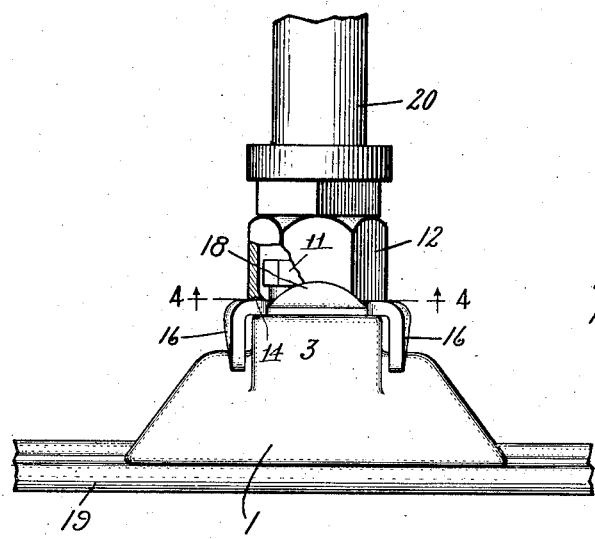
Figure 2:
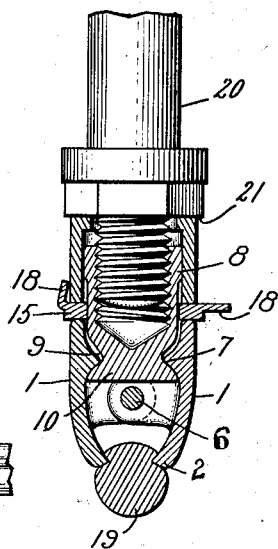
Figure 4:
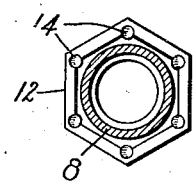
Figure 3:
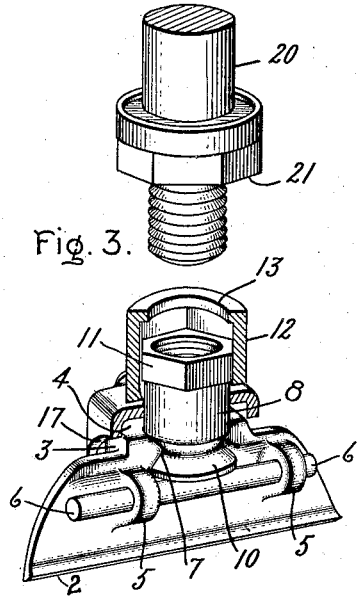
Figure 5:
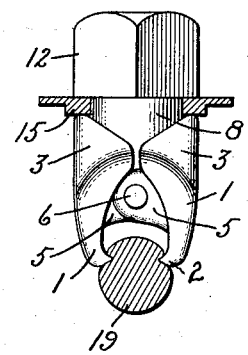

Figure 1 is a side elevation with parts broken away of an ear shown attached to fragments of a trolley wire and suspension bolt; Fig. 2 is a transverse section of the parts shown in Fig. 1; Fig. 3 is a perspective view of the same with parts in section and parts detached; Fig. 4 is an underside sectional view of the nut sleeve taken on line 4—4 of Fig. 1; and Fig. 5 is an end elevation of the ear with the lock washer shown in section.

The ear comprises two jaws 1 provided at their lower ends with extended knife edges 2 and at their upper edges with rectangular bosses 3 having upper surfaces 4 disposed at an angle to the general plane of each ear, so that the upper outer corners are highest. On the inner surface of each ear are two lugs 5 transversely drilled for the reception of a hinge pin 6, and above the horizontal plane of the lugs the ears are each provided with a beveled or conical shoulder 7. An expander nut 8 having a peripheral groove 9 near its lower end forming an upwardly tapering or frusto-conical head 10 engages the conical shoulders 7 of the jaws and operates to wedge them apart when drawn upwardly. The expander nut 8 is cylindrical at its body portion and has at its upper end a polygonal flange 11 for engagement with a correspondingly-shaped nut sleeve 12. The nut sleeve 12 has at its upper end an inturned flange 13 and is at its lower end peened over or upset, as shown at 14, Fig. 4, so as to underlie the flange 11 of the nut and thereby secure the sleeve and nut against disengagement while permitting limited movement of the sleeve lengthwise of the nut.

Between the nut sleeve 12 and the upper ends of the jaw bosses 4 is disposed a lock washer 15, which also serves as a housing for the jaws and consists of a sheet metal punching with its ends 16 bent down at right angles and provided with circular recesses 17 to straddle the ends of the jaws and be thereby held against rotation. The opposite side edges of the washer 15 are provided with flattened lips 18 adapted to be bent up against the polygonal sides of the nut sleeve 12 after having been turned home.

By disposing the lugs 5 unsymmetrically, as shown in Fig. 3, the jaws may be made counterparts, and upon placing two jaws together with their knife edges in contact or in parallelism, and drilling the lugs of both jaws while so held, and then upon inserting of the hinge pin 6, the edges 2 will always move in parallel relation and thereby insure a perfect grip throughout their length upon the trolley wire 19, and by making the head 10 of the expander nut 8 sufficiently large the jaws cannot become displaced therefrom after the hinge pin 6 has been inserted and headed over.

To apply my ear, the jaws 1 are brought into engagement with the trolley wire 19 and the threaded end of an ordinary insulator bolt 20 introduced in the expander nut 8. Then upon rotation of the sleeve 12, and with it the nut 8, the shoulder 21 of the insulator bolt is brought into engagement with the upper end of the sleeve 12 and the expander nut 8 drawn upwardly through the sleeve 12, while the jaws 1 are prevented from rising by reason of their engagement with the washer 15 which engages the lower end of the sleeve 12. The conical head 10 of the nut operates on the conical shoulders 7 to force the upper ends of the jaws apart, and this wedging action is assisted by the upper outer edges 4 of the jaws, which engage the washer 15, being spaced from the vertical plane of the hinge of the jaws whereby a turning moment is exerted thereon as the jaws are raised by the nut.

I do not desire to restrict myself to the particular form or arrangement of parts shown and described, since it is apparent they may be changed and modified without departing from my invention.

What I claim as new and desire to secure by Letters Patent of the United States, is,—

1. In a clamping ear, the combination of two hinged jaws having beveled shoulders on their upper inner surfaces, a grooved expander rotatably engaging said shoulders, and a sleeve surrounding the upper end of said expander and constructed to rotate therewith but free to move longitudinally thereon.

2. In a clamping ear, the combination of two hinged jaws having beveled shoulders on their upper inner surfaces, an expander nut having an upwardly tapered head rotatably engaging said shoulders, and a polygonal sleeve surrounding the upper end of said nut and movable longitudinally thereon.

3. In a clamping ear, the combination of two hinged jaws having beveled shoulders on their upper inner surfaces, an expander nut having a conical head rotatably engaging the lower surfaces of said shoulders, and a polygonal sleeve surrounding the upper end of said nut and movable longitudinally thereon.

4. In a clamping ear, the combination of two hinged jaws, an expander nut rotatably engaging the upper inner surfaces of said jaws and having a polygonal flange at its upper end, and a polygonal sleeve fitting over said flange and projecting under the lower edge of said flange.

5. In a clamping ear, the combination of two hinged jaws, an expander nut having an upwardly tapering head rotatably engaging the upper inner surfaces of said jaws, a sleeve surrounding the upper end of said nut, and a washer interposed between said sleeve and the upper ends of said jaws and provided with side lips and down-turned recessed ends.

In witness whereof, I have hereunto set my hand this 23rd day of August, 1911.

CLINTON J. HIXSON.

Witnesses:
BENJAMIN B. HULL,
HELEN ORFORD.

---

Copies of this patent may be obtained for five cents each, by addressing the "Commissioner of Patents, Washington, D. C."